(12) United States Patent
Li et al.

(10) Patent No.: US 7,977,827 B2
(45) Date of Patent: Jul. 12, 2011

(54) STEPPER MOTOR DEVICE

(75) Inventors: Yue Li, Hong Kong (CN); Jian Zhao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 29 days.

(21) Appl. No.: 12/332,746

(22) Filed: Dec. 11, 2008

(65) Prior Publication Data
US 2009/0152974 A1 Jun. 18, 2009

(30) Foreign Application Priority Data
Dec. 14, 2007 (CN) .................... 2007 2 0196041 U

(51) Int. Cl.
*H02K 37/00* (2006.01)
(52) U.S. Cl. ................................ 310/49.02; 310/49.07
(58) Field of Classification Search .... 310/49.01–49.09, 310/49.21, 257, 263
See application file for complete search history.

(56) References Cited

U.S. PATENT DOCUMENTS

| | | | | |
|---|---|---|---|---|
| 3,304,451 A | * | 2/1967 | Scholten | 310/181 |
| 3,330,975 A | * | 7/1967 | Osterwalder | 310/164 |
| 3,356,876 A | | 12/1967 | Scholten | |
| 4,920,292 A | * | 4/1990 | Albrecht et al. | 310/114 |
| 4,973,866 A | * | 11/1990 | Wang | 310/49.03 |
| 5,097,162 A | * | 3/1992 | Wang | 310/49.03 |
| 5,973,425 A | * | 10/1999 | Aoshima | 310/49.19 |
| 6,465,916 B1 | * | 10/2002 | Aoshima | 310/49.02 |
| 2002/0047334 A1 | * | 4/2002 | Aoshima | 310/49 R |

* cited by examiner

*Primary Examiner* — Thanh Lam
(74) *Attorney, Agent, or Firm* — Muncy, Geissler, Olds & Lowe PLLC

(57) ABSTRACT

A stepper motor device has a stator and a rotor. The rotor comprises: a shaft; a rotor core associated with the shaft; and a magnet fixed to the rotor core. The stator comprises: a stator shell; a yoke disposed within the shell; a coil wound about the yoke and an end plate magnetically connecting the yoke to the stator shell. The coil is located beside the magnet in the axial direction of the motor. The stator has a number of salient poles, and the salient poles are arranged to face the magnet across a small air gap. The coil creates magnetic poles in the salient poles with a common polarity.

13 Claims, 4 Drawing Sheets

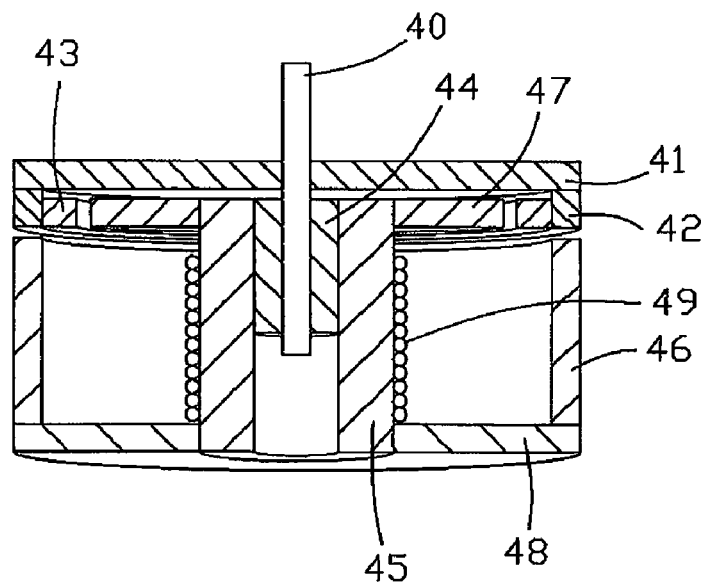
FIG. 5
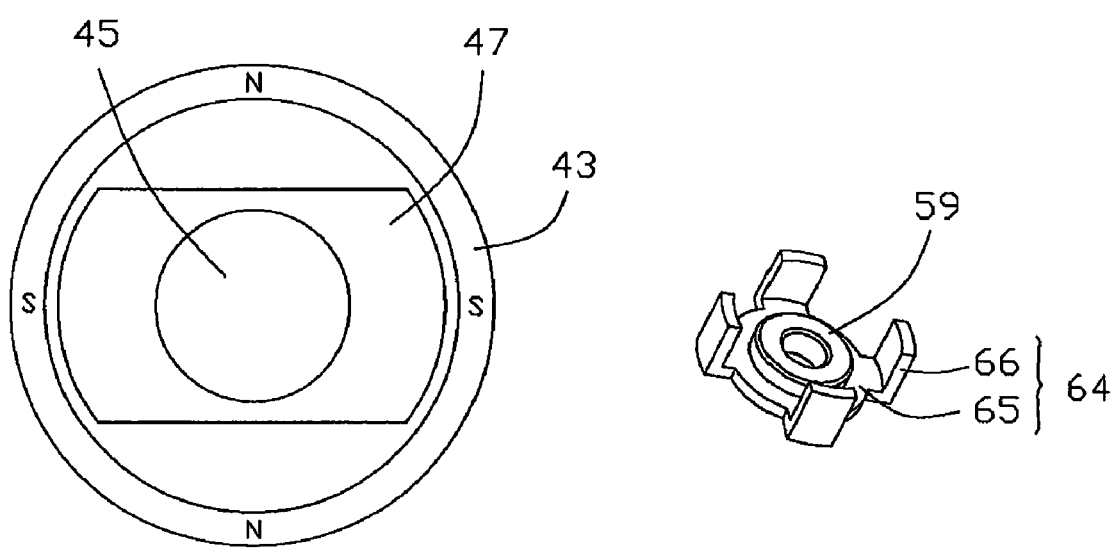
FIG. 6
FIG. 9

STEPPER MOTOR DEVICE

CROSS REFERENCE TO RELATED APPLICATIONS

This non-provisional patent application claims priority under 35 U.S.C. §119(a) from Patent Application No. 200720196041.8, filed in The People's Republic of China on 14 Dec. 2007.

FIELD OF THE INVENTION

The present invention relates to a stepper motor device.

BACKGROUND OF THE INVENTION

Stepper motor devices may be divided into rotating and reciprocating step devices. A synchronous motor is one example of a single-phase rotating step device and a common stepper motor is an example of a two-phase rotating step device. A single-phase stepper motor device comprises a group of magnetic circuit components, namely, a rotor, a coil, a shell or stator core and a magnet.

Stepper motor devices have a simple structure and a certain control precision, being applied broadly, such as in driving and controlling systems. In low power applications, a claw pole structure is generally used. The magnetic field produced by the coil of the motor varies alternately.

Stepper motor devices are commonly divided into single-phase and multi-phase, wherein a single-phase stepper motor device comprises a stator, a coil and multiple magnets of alternate polarities, and a multiphase step device comprises multiple single-phase devices. The structure of an ordinary two-phase claw pole stepper motor is shown in FIG. 1, wherein it comprises a claw pole stator 101, a coil 102, a magnet 103, and a rotor 104. In the radial direction of the motor, the coil 102 is at the outer surface of the poles of the stator 101, and the magnet 103 is at the inner surface of the stator and fixed to the rotor 104. The magnet is formed as a ring which is smaller than the coil, and has a large number of magnetic poles. Thus, it is quite difficult to magnetize the magnet.

A magnetic field structure of the same polarity is disclosed in U.S. Pat. No. 3,356,876, wherein its salient pole is constructed by a laminated core, and the core rotates with the magnet being stationary; for inner rotor motors magnetizing in radial direction, an air gap is provided between the internal surface of the magnet and the stator core; because the influence of the thickness in radial direction of the magnet, the external diameter of the air gap decreases, and the energy generated through the air gap by the device has little change, so the output force of the device decreases. At the same time, for devices with smaller external diameter, the magnet thereof is correspondingly small, and needs to be magnetized as a whole to form alternate magnetic poles uniformly distributed at the inner surface of the magnetic ring; because it is hard to push the magnetizing fixture into the inner hole of the magnet, it is more difficult to magnetize.

SUMMARY OF THE INVENTION

To overcome the above said disadvantages of the conventional art, the present invention provides a stepper motor device having a magnet with multiple poles and a coil forming a magnetic field wherein the coil is located axially beside the magnet to reduce the radial dimension of the device.

Accordingly, in one aspect thereof, the present invention provides a stepper motor device comprising: a rotor core, a magnet fixed to the rotor core, and a stator including a magnetically conductive shell and a coil disposed in the shell, the stator having a salient pole arranged to face the magnet across a small air gap, characterized in that the coil is disposed axially beside the magnet.

Preferably, the rotor comprises a shaft, the rotor core and the magnet, characterized in that the rotor core is a laminated iron core fixed to the shaft.

Preferably, the device is a single-phase stepper motor device, and the magnet is magnetized to form multiple alternate magnetic poles.

Preferably, the magnet is magnetized to form twelve alternate magnetic poles in the radial direction, and the shell is provided with six salient poles.

Preferably, the device is an outer rotor stepper motor device, and the magnet has four magnetic poles, and the stator has an end plate forming two salient poles.

Preferably, the coil and the magnet are separately located at axially spaced locations.

According to a second aspect thereof, the present invention provides a multi-phase stepper motor device comprising a plurality of single-phase stepper motor devices as set forth above.

Preferably, the device comprises two rotors disposed at opposite axial ends of the device.

Preferably, the device has two coils and two rotors, wherein the two rotors are disposed axially between the two coils.

Preferably, the device is a multi-phase device and there is a separate coil for each phase.

Comparing with the conventional art, in the stepper motor device of the present invention, multiple magnets or magnetic poles are fixed to the rotor; the coil is wound in the magnetic conductive stator shell, and the coil is set beside the magnets; the stator is provided with multiple salient poles, and the salient poles face the magnetic poles; the magnet or magnets of the rotor are not surrounded by the coil, and the magnetic field produced by the coil in the salient poles of the stator has the same polarity.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

FIG. 5 is a structure schematic diagram of an outer rotor stepper motor device according to the present invention utilizing radial magnetizing method;

FIG. 6 is a structure schematic diagram of a salient pole and a magnet of the outer rotor stepper motor device of FIG. 5;

FIG. 9 is a perspective view of an auxiliary pole element, according to a further embodiment.

DESCRIPTION OF THE PREFERRED EMBODIMENTS

Figure 1:
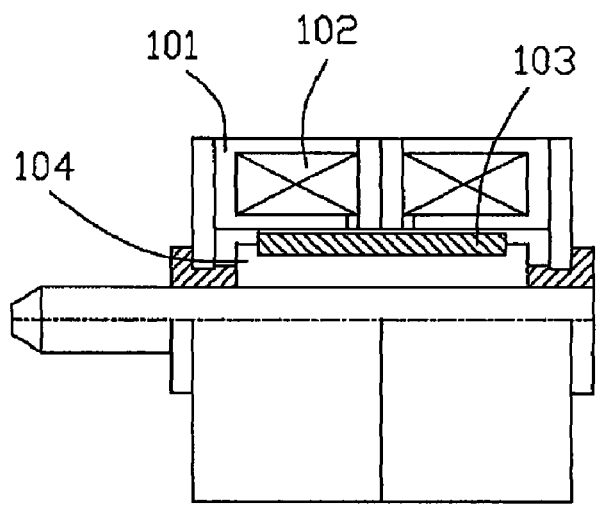
FIG. 1 is a structure schematic diagram of a conventional two-phase claw pole stepper motor.
Figure 2:
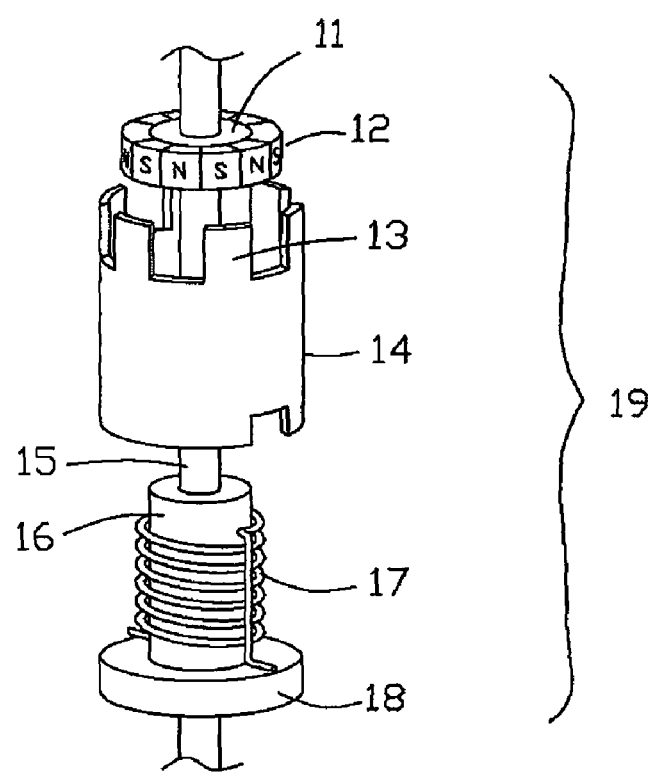
FIG. 2 is a structure schematic diagram of a single-phase stepper motor device according to the present invention utilizing radial magnetizing method.

FIG. 2 is a schematic diagram of the structure of a single-phase stepper motor device according to a first embodiment of the present invention adopting radial magnetizing method. The single-phase stepper motor device 19 comprises rotor and a stator. The rotor includes a shaft 15, a rotor core 11 fixed to the shaft and a magnet 12 fixed to the rotor core. The rotor core may be magnetically conductive or magnetically non-conductive depending on the particular construction. For a magnetically conductive rotor core it is preferred that the rotor core is formed from stamped silicon steel or iron sheet laminations. The stator includes a stator a stator shell 14, preferably of iron and having a salient pole 13, a yoke 16, preferably of iron, a coil 17 wound about the yoke and an end plate 18 which may be formed integrally with the yoke. By integrally we mean as a single piece, monolithic construction or as multiple pieces joined together. It is preferred that the yoke 16 and the end plate 18 are formed by stacking stamped silicon steel or iron sheet laminations.

In stepper motor 19 of FIG. 2, the magnet 12 is magnetized in the radial direction to form twelve alternate magnetic poles; the stator shell 14 is provided with six salient poles 13; the magnet 12 is affixed to the rotor core 11, and the rotor core 11 is fixed to the shaft 15. After assembled, the magnet 12 will face the salient poles 13 of the stator across a small air gap. The coil 17 is wound about the yoke 16, and the coil 17 and an end plate 18 is disposed in the shell 14. A bearing structure, such as an axial thrust bearing surface, is provided in the end plate 18 to limit movement of the shaft 15 in the axial direction.

A bearing for rotationally supporting the shaft 15 may be located at either, or both, axial end of the yoke 16. The bearing and the end plate may be formed as a single, one piece component.

When the bearing is located between the yoke and the rotor core; it is preferred that the bearing be magnetically conductive.

Figure 4:
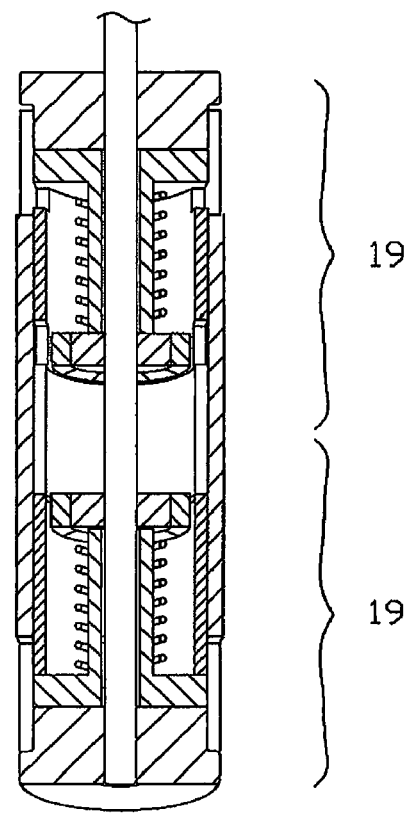
FIG. 4 is a structure schematic diagram of a two-phase stepper motor device according to the present invention utilizing radial magnetizing method.

In FIG. 4, bearings are located axially outside of the end plates.

The magnet 12 can also be directly fixed to the shaft 15, in which case the magnet is also the rotor core.

Figure 3:
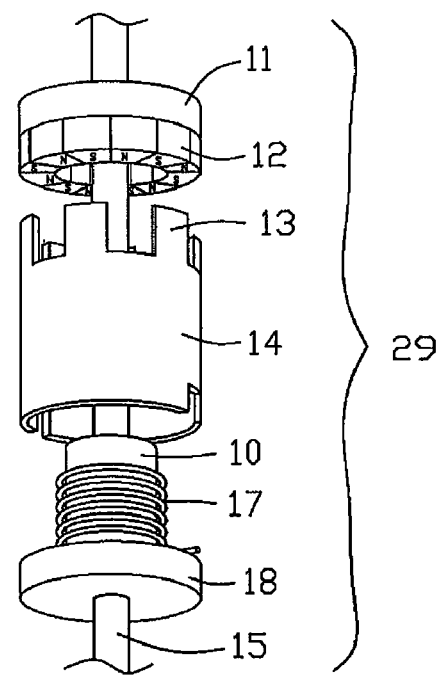
FIG. 3 is a structure schematic diagram of a single-phase stepper motor device according to the present invention utilizing axial magnetizing method.

FIG. 3 is a schematic diagram of the structure of a single-phase stepper motor device according to a second embodiment of the present invention. In this device the magnet is charged using an axial magnetizing method. The remaining structure of the device is similar to the structure of device 19, except that the salient poles of the stator shell faces the magnetic poles of the magnet across a small air gap in the axial direction. As such, the radial dimension of the stator shell 14, at the salient poles 13 is similar to the radial dimension of the magnet 12. Thus the device has an axial air gap construction.

If the number of the salient poles is p, then the number of the magnetic poles of the magnet may be any integer not more than 2*p. The angle of each magnetic pole are about 180/p°. In normal situation, 2*p magnets are adopted, which means more electromagnetic output and easier to form the magnetic poles on a single ring magnet. It is preferable to magnetize the magnet in the axial direction or the radial direction, however; other magnetization directions, such as in polar direction, is possible. Generally, magnetizing the outer ring of a magnetic ring using a surface magnetization method is the easiest. Axial magnetization is easier than magnetizing the inner surface of a ring magnet which is especially difficult for very small ring magnets. True radial magnetization as opposed to surface radial magnetization requires magnetization of the inner surface of the ring. The ring magnet may be a single monolithic magnet or it could be several magnet pieces joined or held together to function as a ring. Indeed, for some applications where the number of poles is less than 2*P, a number of adjacent magnetic pole pairs may be omitted simplifying assembly.

The magnet flux produced by the coil 17 of the single-phase stepper motor device 19, 29 will pass from the yoke 16, to the end plate 18, to the stator shell 14, to the salient poles 13, across the air gap, to the magnet and the rotor core 11 and back to the yoke 16, to complete the magnetic path. The coil 17 generates a unified single pole magnetic field at the salient poles 13 of each phase. That is each salient pole 13 of the stator shell 14 has the same polarity. This magnetic field of the same polarity, i.e. N pole, will push the N pole of the magnet and attract the S pole of the magnet. When the S pole of the magnet is pulled to below the salient poles, the direction of the current in the coil is changed, and the salient poles form S poles; which repel the S poles of the magnet below the salient poles and attract the N poles of the magnet. Due to the effect of inertia, the device may continue to rotate in one direction.

FIG. 4 is a schematic diagram of the structure of a two-phase stepper motor device according to a further embodiment of the present invention having a radial air gap. Each phase of the two-phase motor device comprises a basic structure corresponding to the motor device 19 of FIG. 2. The stator shell of each phase can be coupled together by way of injection molding or bonding, or can be formed as one common shell. However, it is preferred if the magnetic circuit of each phase is independent of the other. When the two phases are physically very close, the magnetic field produced by the magnetic circuit of one phase may affect the magnetic circuit of the other phase. In many applications this will be acceptable. In FIG. 4, both rotors are located between the two stators. Constructions with one or both rotors being located axially outward of the stator are also feasible.

The device of FIG. 4 could be modified by using two stepper motor devices 29 of FIG. 3 to form a two-phase axial gap stepper motor. The construction otherwise being similar to that described above.

The two-phase stepper motor device comprises two magnetic circuits connected together by mechanical means and using a common shaft. The magnetic circuits and electric circuits of the two phases have a certain phase difference; usually it is 90 degrees of electrical angle, to make the stepper motor device rotate along a predetermined direction. Logic control can also be added into the control of coil current, for example, changing the rotation direction of the motor and step control are implemented by changing the time sequence of the current. Of course the two-phase step device can also implement reciprocating motion between limited angles, which depends on the control strategy of the circuit board. The power supply of the two-phase step device may be AC sine wave, square wave, etc.

Referring to FIG. 5 and FIG. 6, FIG. 5 is a schematic diagram of the structure of an outer rotor stepper motor device according to another embodiment of the present invention using radial magnetizing method, and FIG. 6 is a schematic diagram of the salient pole and magnet of the device of FIG. 5. The outer rotor stepper motor device comprises a shaft 40, a magnetically non-conductive support 41, a ring magnet 43, a bearing 44, a yoke 45, a coil 49, a pole plate 47, stator housing or shell 46 and end plate 48. The ring magnet 43 is radially magnetized with four magnetic poles 43. The pole plate 47 is fixed to one end of the yoke 45 and is shaped to provide two salient poles. The magnet 43 is affixed to a magnetically conductive rotor core 42, preferably a laminated iron core, which is fixed to the shaft 40 via the support 41. The bearing 44 is a sleeve bearing or bushing pressed into a through hole in the yoke 45 for rotatably supporting the shaft 40. The coil 49 is wound about the yoke 45 and is accommodated in the space formed between the yoke 45, pole plate 47, stator shell 46 and end plate 48. The magnetic circuit is from the yoke 45 through the pole plate 47, to the magnet 43, to the rotor core 42, across the axial air gap to the stator shell 46, through the end plate 48 and back to the yoke 45.

Figure 7:
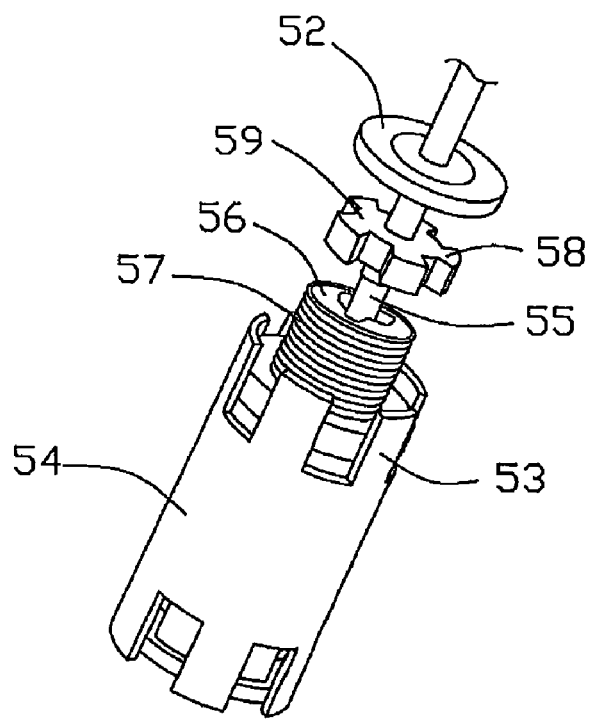
FIG. 7 and FIG. 8 are structure schematic diagrams of a two-phase stepper motor device according to the present invention with two rotors being disposed at the two sides in the axial direction of the two-phase step device.
Figure 8:
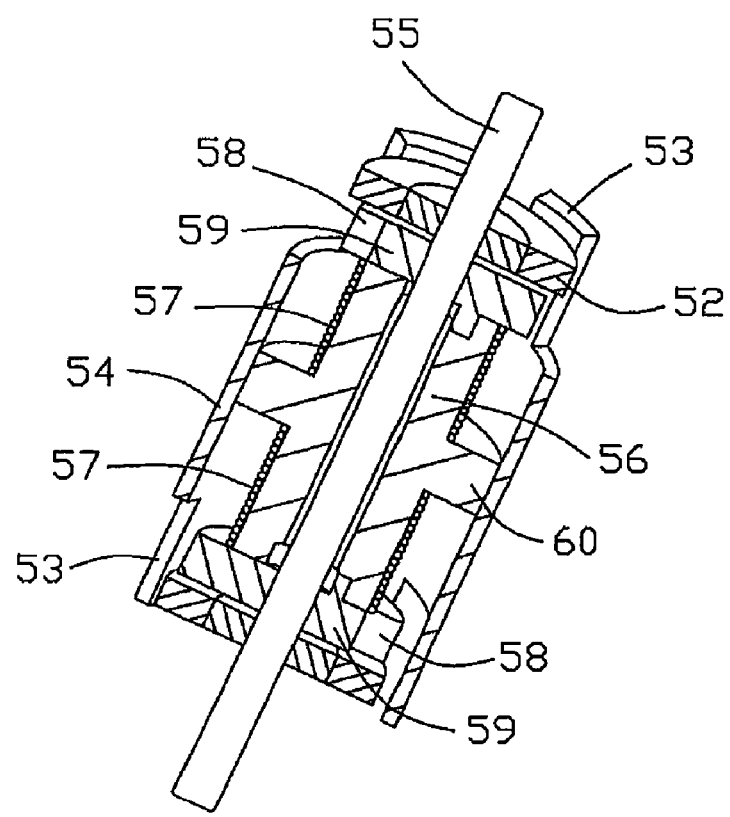

FIGS. 7 and 8 are schematic diagrams of the structure of a two-phase stepper motor device according to another embodiment of the present invention. The motor is similar to the motor of FIG. 4 in that it comprises two single phase motors joined together. However, the stators are located axially between the rotors. While the motor shown is of the radial air gap construction, it should be appreciated that the motor could be of the axial air gap construction.

The two stators have been combined such that there is a single common stator housing or shell 54 and a common end plate 60 which is located between the two yokes 56. Optionally, the two yokes and the end plate may be formed as a single piece and is preferably formed by stacking together laminations formed by stamping silicon steel or iron sheet. Thus the two yokes can be considered as a single yoke 56 with the end plate 60 dividing the yoke into two halves. The two coils 57 are wound about respective halves of the yoke 56. The end plate 60 supports the stator shell 54 and provides the flux path between the yoke and the stator shell 54. Each end of the stator shell 54 has a plurality of salient poles 53 which confront the magnets 52. Each magnet 52 is fixed to the shaft 55, is magnetized in the radial direction. Thus the salient poles 53 confront the magnetic poles of the magnet across a small air gap in the radial direction.

A bearing 59 is fixed to each end of the yoke 56 to rotatably support the shaft 55. The bearings may be keyed to the yoke to prevent relating movement there between. The bearing is magnetically conductive and has radially extending projections 58 which project towards the spaces between the salient poles 53. Ideally, there is the same number of projections 58 as salient poles 53, with the projections 60 and salient poles 53 alternating circumferentially. The projections provide or act as auxiliary stator poles have the opposite polarity to the salient poles 53. This structure can enhance the magnetic flux path of the stator. Preferably, the bearing 59 a sintered iron bushing.

FIG. 9 illustrates a modified bearing arrangement for the motor of FIG. 8. The bearing arrangement comprises a standard sintered bushing 59 which may or may not be magnetically conductive. A claw plate 64 is fitted to the bearing and replaces the projections 58 of the bearing of FIG. 8. The claw plate 64 has a disc portion 65 with a central hole in which the bearing 59 is fitted. Pole fingers 66 extend radially from the disc portion 65 and then are bent to extend axially so as to locate about the magnet 52 between the salient poles 53 of the stator shell 54 and to face the magnet 52 across the air gap. The pole fingers 66 form auxiliary stator poles of opposite polarity to the salient poles 53. This gives greater linking of the magnetic flux from the magnet to the yoke 56.

Alternatively, the claw plate 64 may be directly pressed on or otherwise fixed to the end of the yoke 56.

If the motor is designed as an axial gap motor, similar to the device 29 of FIG. 3, the pole fingers would extend radially to confront the magnet across an axial air gap between the salient poles of the stator shell.

According to one embodiment of the present invention, the stepper motor device has multiple magnets fixed to the rotor; the coil is wound about a magnetically conductive bobbin or yoke, and the coil is located beside or between the magnets; the stator is provided with multiple salient poles, and the salient poles face the magnets. The magnets are not surrounded by the coil in the radial direction, and the magnetic field produced by the coil in the space between the magnets and the respective stator poles has a single polarity.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stepper motor device comprising:
   a rotor including a shaft, a rotor core, which is a laminated iron core fixed to the shaft, and a magnet fixed to the rotor core, and
   a stator including a magnetically conductive shell and a coil disposed in the shell, the stator having a salient pole arranged to face the magnet across a small air gap, wherein the coil is disposed axially beside the magnet.

2. A stepper motor device of claim 1, wherein the device is a single-phase stepper motor device and the magnet is magnetized to form multiple alternate magnetic poles.

3. The stepper motor device of claim 2, wherein the magnet is magnetized to form twelve alternate magnetic poles in the radial direction, and the shell is provided with six salient poles.

4. The stepper motor device of claim 1, wherein the device is an outer rotor stepper motor device, and the magnet has four magnetic poles, and the stator has an end plate forming two salient poles.

5. The stepper motor device of claim 1, wherein the coil and the magnet are separately located at axially spaced locations.

6. A multi-phase stepper motor device comprising a plurality of single-phase stepper motor devices as defined in claim 1.

7. The multi-phase stepper motor device of claim 6, wherein the device comprises two rotors disposed at opposite axial ends of the device.

8. The multi-phase stepper motor device of claim 6, wherein the device has two coils and two rotors, wherein the two rotors are disposed axially between the two coils.

9. The stepper motor device of claim 1, wherein the device is a multi-phase device and there is a separate coil for each phase.

10. The stepper motor device of claim 1, wherein the shaft is journalled in a magnetically conductive bearing disposed between the rotor core and the coil and the bearing has radial projections forming auxiliary stator poles.

11. The stepper motor device of claim 1, wherein the shaft is journalled in a bearing disposed between the rotor core and a claw plate is fitted to the bearing, the claw plate having finger poles which confront the magnet across a small air gap to form auxiliary stator poles.

12. The stepper motor device of claim 1, wherein the coil is wound about a magnetically conductive yoke and a claw plate is fitted to an end of the yoke adjacent the magnet, the claw plate having finger poles which confront the magnet across a small air gap to form auxiliary stator poles.

13. The stepper motor device of claim 1, wherein the coil is wound about a yoke formed of a stack of steel laminations, and the yoke is integrated with the end plate.

* * * * *